United States Patent
Kidorf et al.

(12)
(10) Patent No.: US 6,181,464 B1
(45) Date of Patent: Jan. 30, 2001

(54) LOW NOISE RAMAN AMPLIFIER EMPLOYING BIDIRECTIONAL PUMPING AND AN OPTICAL TRANSMISSION SYSTEM INCORPORATING SAME

(75) Inventors: Howard David Kidorf, Red Bank; Xiaobing Ma, Morganville; Morten Nissov, Holmdel, all of NJ (US)

(73) Assignee: TyCom (US) Inc., Morristown, NJ (US)

( * ) Notice: Under 35 U.S.C. 154(b), the term of this patent shall be extended for 0 days.

(21) Appl. No.: 09/204,035

(22) Filed: Dec. 1, 1998

(51) Int. Cl.[7] .............................. H01S 3/30; G02B 6/28; H07F 7/00
(52) U.S. Cl. ................. 359/334; 359/134; 359/345; 372/3; 372/71
(58) Field of Search .................... 359/124, 134, 359/160, 327, 334, 345; 372/3, 71

(56) References Cited

U.S. PATENT DOCUMENTS

| | | | |
|---|---|---|---|
| 4,389,617 | * 6/1983 | Kurnit | 359/334 |
| 4,394,623 | * 7/1983 | Kurnit | 359/334 |
| 4,699,452 | * 10/1987 | Mollenauer et al. | 359/334 |
| 4,720,684 | * 1/1988 | Byron | 359/134 |
| 5,191,628 | * 3/1993 | Byron | 359/134 |
| 5,673,280 | * 9/1997 | Grubb et al. | 372/3 |

FOREIGN PATENT DOCUMENTS

954072 * 11/1999 (EP).

OTHER PUBLICATIONS

Stentz et al, DSA Trends in Optics & Photonics, vol. 5, pp 350–368, Jul. 13, 1996.*

Nissan et al, Electronics Letters, vol. 35, #12, pp 997–8, Jun. 10, 1999.*

* cited by examiner

Primary Examiner—Nelson Moskowitz

(57) ABSTRACT

A method and apparatus provides pump energy to an optical fiber located along an optical transmission path. The optical fiber imparts Raman amplification to an optical signal traveling therein when pumped at a pump wavelength. In accordance with the method, a first beam of pump energy is generated at the pump wavelength of the optical signal and a second beam of pump energy at a wavelength one Raman Stokes order below the pump wavelength. The first beam of pump energy is introduced to the optical fiber so that it contrapropagates with respect to the optical signal. The second beam of pump energy is introduced to the optical fiber so that it co-propagates with respect to the optical signal. The second beam of pump energy does not pump the signal (thus minimizing noise) but rather serves to pump the first pump beam by the production of Raman Stokes- shifted light.

24 Claims, 8 Drawing Sheets

BASIC RAMAN OPTICAL AMPLIFIER

DUAL PUMPED RAMAN OPTICAL AMPLIFIER

DUAL PUMPED RAMAN OPTICAL AMPLIFIER

LOW NOISE RAMAN AMPLIFIER EMPLOYING BIDIRECTIONAL PUMPING AND AN OPTICAL TRANSMISSION SYSTEM INCORPORATING SAME

FIELD OF THE INVENTION

The present invention relates generally to optical amplifiers, and more particularly to a Raman amplifier employing bidirectional pumping.

BACKGROUND OF THE INVENTION

Broad bandwidth optical transmission systems have received a great deal of attention in recent years. Such systems require broad bandwidth optical amplifiers to achieve transmission of high capacity wavelength division multiplexed signals. A type of optical amplifier that is sometimes employed is a so-called distributed amplifier in which signal amplification occurs along the signal transmission path. Examples of distributed amplifiers include distributed Erbium doped fiber amplifiers and Raman amplifiers.

Raman amplification is accomplished by introducing the signal and pump energies along the same optical fiber. A Raman amplifier uses stimulated Raman scattering, which occurs in silica fibers (and other materials) when an intense pump beam propagates through it. Stimulated Raman scattering is an inelastic scattering process in which an incident pump photon looses its energy to create another photon of reduced energy at a lower frequency. The remaining energy is absorbed by the fiber medium in the form of molecular vibrations (i.e., optical phonons). That is, pump energy of a given wavelength amplifies a signal at a longer wavelength. The relationship between the pump energy and the Raman gain for a silica fiber is shown in FIG. 1. The particular wavelength of the pump energy that is used in this example is denoted by reference numeral 1. As shown, the gain spectrum 2 for this particular pump wavelength is shifted in wavelength with respect to the pump wavelength.

The pump energy may be introduced on the transmission fiber so that the pump and signal are either copropagating or counterpropagating with respect to one another. Additionally, in yet another pumping arrangement, both copropagating and contrapropagating pump energy may be employed, which will hereinafter be referred to as bidirectional pumping. Bidirectional pumping offers a number of advantages over unidirectional pumping (whether copropagating or contrapropagating). For example, bidirectional pumping may advantageously provide a substantially constant distribution of pump power over the transmission fiber, reduce the impairments caused by double Rayleigh reflections, and improve the noise performance. In contrast, when unidirectional pumping is employed, the distribution of pump power over the transmission fiber decreases at least exponentially (depending on pump depletion) from the point along the transmission fiber at which the pump power is introduced.

It has been found that double Rayleigh scattering can be a serious noise source in typical distributed fiber amplifiers, due largely to the relatively long length of the typical fiber. Double Rayleigh light is twice backscattered by unavoidable density fluctuations in the amplifier fiber such that it propagates in the downstream direction (i.e., the direction in which the signal travels) and adds noise, specifically, multiple signal interference, to the signal. Although the amplitude of double Rayleigh light is generally small, the light is amplified in the same way the signal is amplified in the Raman amplifier, resulting in significant noise amplitude. Indeed, it can be shown that double Rayleigh light increases as the square of the length of the amplifier fiber for an ideal distributed amplifier. Thus, noise due to this mechanism can be several orders of magnitude more in Raman amplifiers and in distributed erbium doped fiber amplifiers than in lumped erbium-doped fiber amplifiers. Bidirectional pumping reduces the imparments caused by this effect.

One problem that arises in forward and bidirectionally pumped Raman amplifiers is that a Raman amplifier employing a copropagating pump beam is generally noisy. This effect is well known to be caused by coupling of pump intensity fluctuations to the signal. It has until now necessitated backward pumping of Raman amplifiers.

Thus, while a bidirectionally pumped Raman amplifier has a number of attractive features, a significant disadvantage is the relatively high level of noise produced as a result of the contribution from the copropagating pump beam.

SUMMARY OF THE INVENTION

The present invention provides a method and apparatus for providing pump energy to an optical fiber located along an optical transmission path. The optical fiber imparts Raman amplification to an optical signal traveling therein when pumped at a pump wavelength. In accordance with the method, a first beam of pump energy is generated at the pump wavelength of the optical signal and a second beam of pump energy at a wavelength one Raman Stokes order below the pump wavelength. The first beam of pump energy is introduced to the optical fiber so that it contrapropagates with respect to the optical signal. The second beam of pump energy is introduced to the optical fiber so that it co-propagates with respect to the optical signal.

In the present invention, the second beam of pump energy does not pump the signal (thus minimizing noise) but rather serves to pump the first pump beam by the production of Raman Stokes- shifted light.

In accordance with another aspect of the invention, an optical transmission system is provided that includes first and second terminals remotely located with respect to one another. An optical transmission path couples the first terminal to the second terminal for transmitting an optical signal therebetween. A Raman amplifier provides gain to the optical signal in at least a portion of the optical transmission path. The amplifier includes a first source of pump energy at the pump wavelength of the optical signal for providing a first beam of pump energy contrapropagating with respect to the optical signal. The amplifier also includes a second source of pump energy at a wavelength one Raman Stokes order below the pump wavelength for providing a second beam of pump energy copropagating with respect to the optical signal.

DETAILED DESCRIPTION

Figure 1:
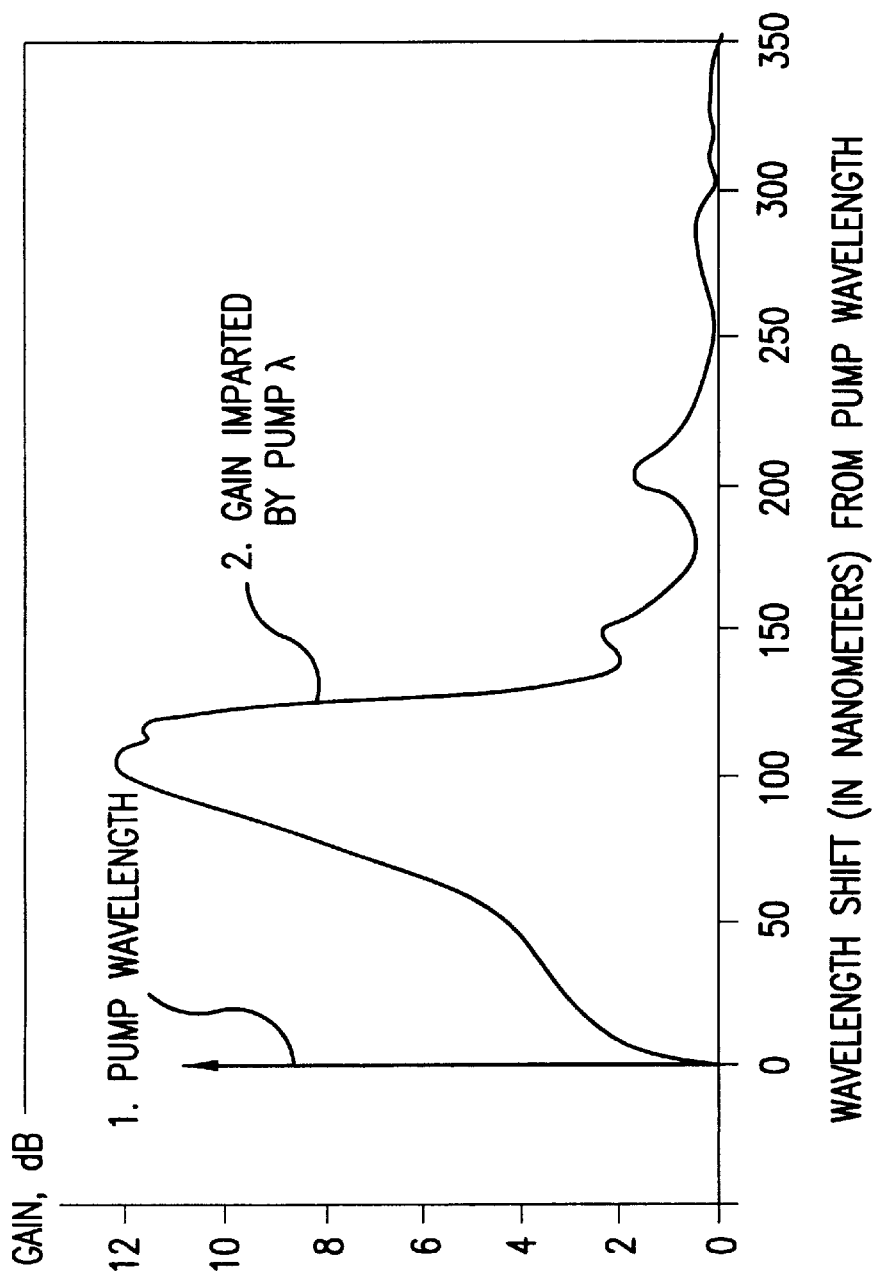
FIG. 1 shows the relationship between pump energy and Raman gain for a silica fiber.
Figure 2:
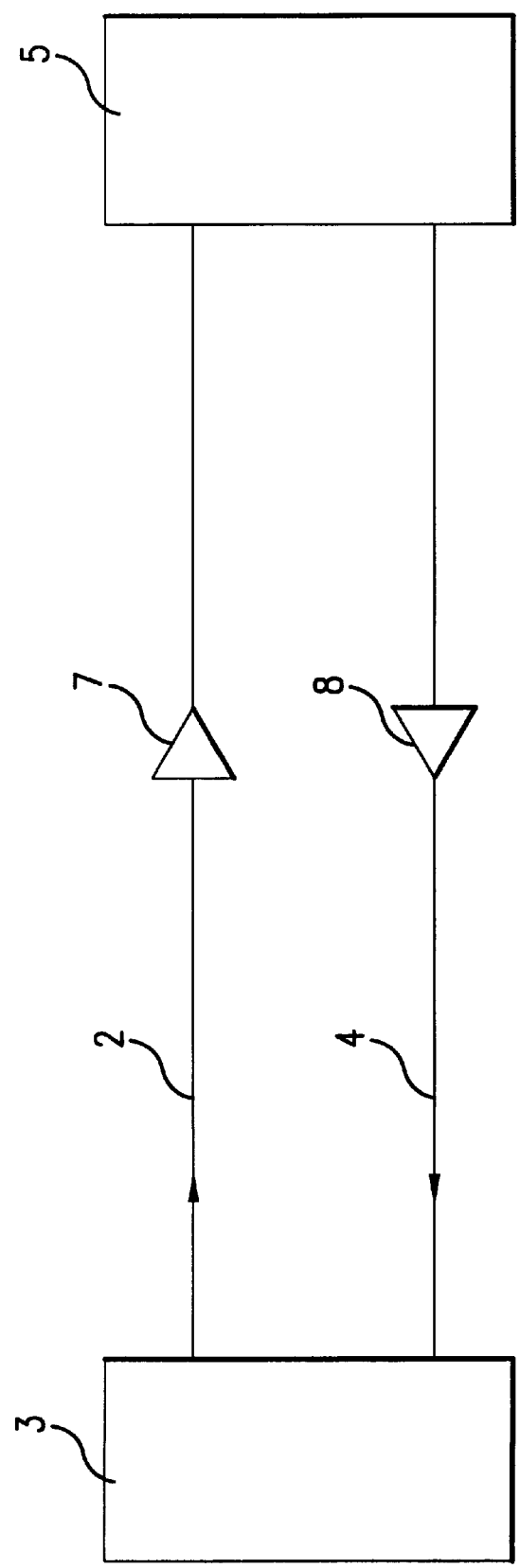
FIG. 2 shows an optical communication system that employs optical amplifiers.

Referring to FIG. 2, there is disclosed a lightwave communication system which utilizes optical fiber amplifiers such as Raman amplifiers. The system includes transmitter/receiver terminals 3 and 5 and optical transmission fiber paths 2 and 4 supporting bidirectional communication. The signals being transmitted from the terminals 3 and 5 are in optical form. There is no intermediate conversion to electrical form. A plurality of optical amplifiers 7 and 8 are interposed in the fiber paths 2 and 4 between the transmitter/receiver terminals 3 and 5. Optical amplifiers 7 and 8 contain a length of fiber that provides a gain medium, an energy source that pumps the fiber to provide gain, and a means of coupling the pump energy into the fiber without interfering with the signal being amplified. In the case of Raman amplifiers, the fiber providing the gain medium is the transmission path itself. These components of the optical amplifiers are shown in greater detail in FIG. 3. While only one pair of optical amplifiers is depicted in FIG. 2 for clarity of discussion, it should be understood by those skilled in the art that the present invention finds application in transmission paths of all lengths having many additional pairs of optical amplifiers.

Figure 3:
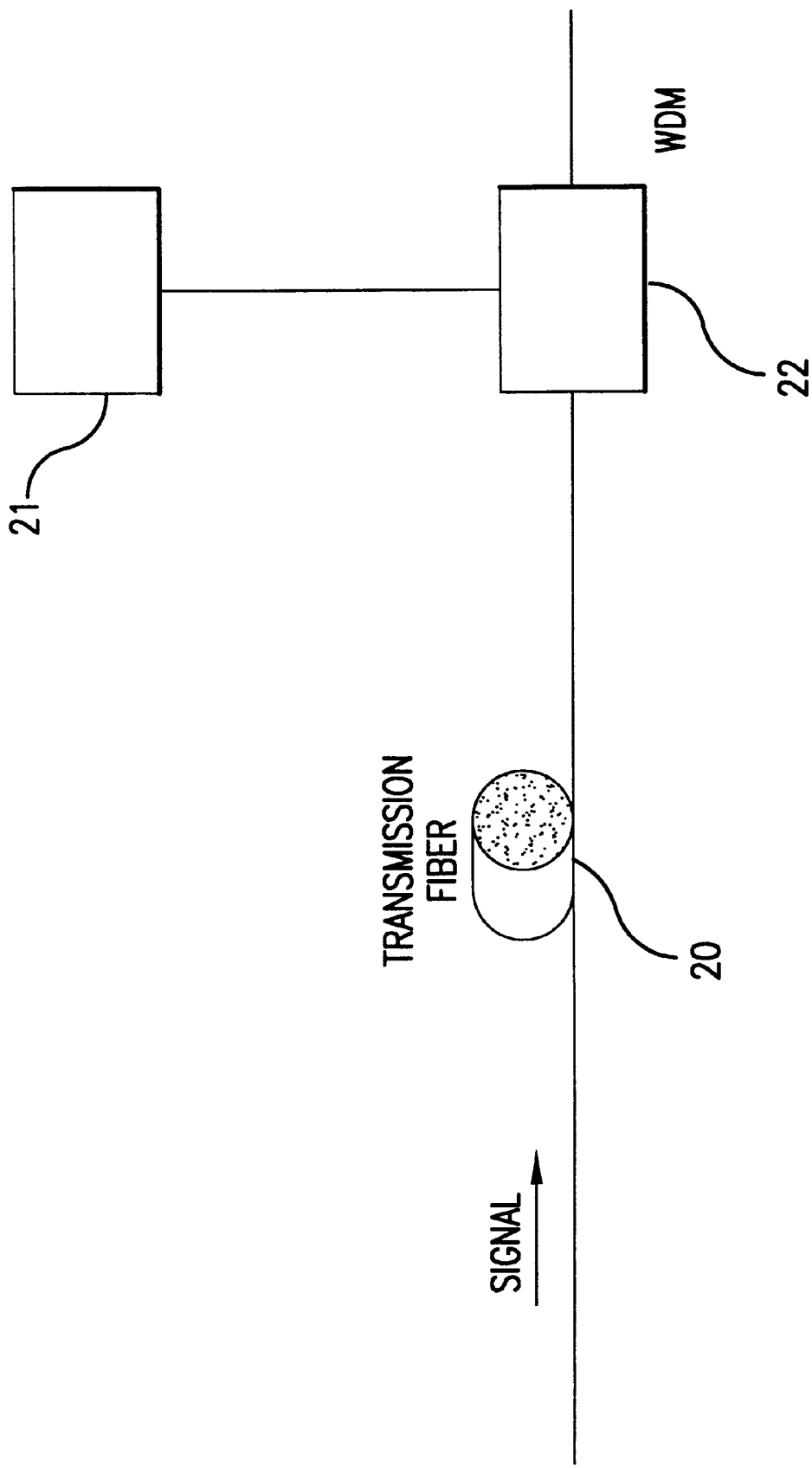
FIG. 3 shows the pertinent details of a known Raman amplifier.
Figure 4:
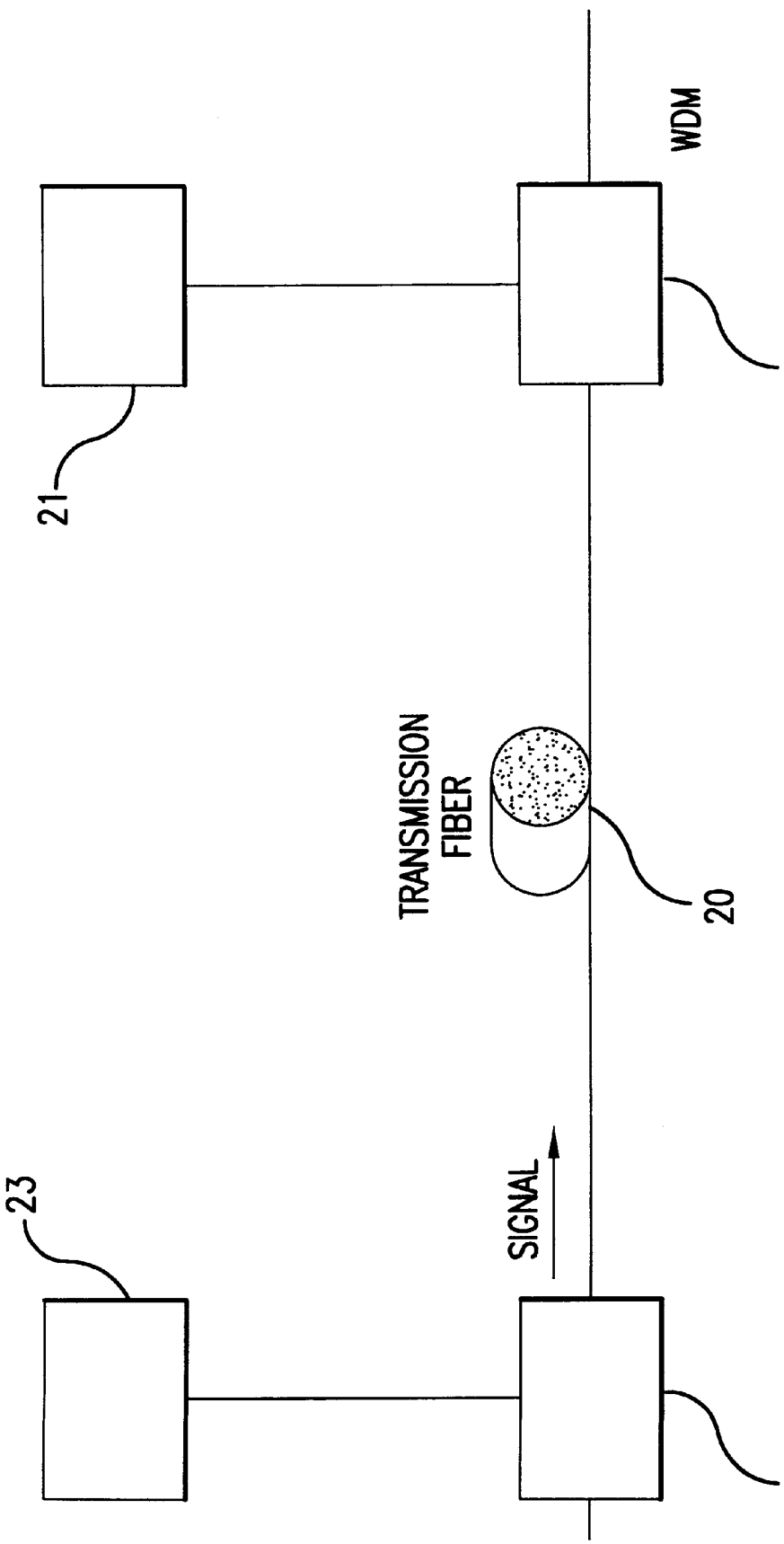
FIG. 4 shows another example of a Raman amplifier, which employs bidirectional pumping.

Referring to FIG. 3, each distributed optical amplifier includes an optical fiber portion 20 of the transmission path in which Raman gain is to be generated. This portion 20 of fiber may vary in size and may be limited, for example, to a small section of the transmission path. Alternatively, the fiber portion 20 in which Raman gain is generated may have a length encompassing the entire transmission path. The fiber portion 20 is coupled to a source of optical pump energy 21 via a coupler 22 such as a wavelength division multiplexer (WDM). The Raman amplifier depicted in FIG. 3 employs a contrapropagating pump beam. As previously mentioned, in other arrangements a copropagating beam and bidirectional pumping may be employed. For example, FIG. 4 shows a bidirectionally pumped Raman amplifier using pump sources 21 and 23. Pump source 21 provides a pump beam that travels in a contrapropagating direction with respect to the signal and pump source 23, via coupler 24, provides a pump beam that travels in a copropagating direction with respect to the signal.

Figure 5:
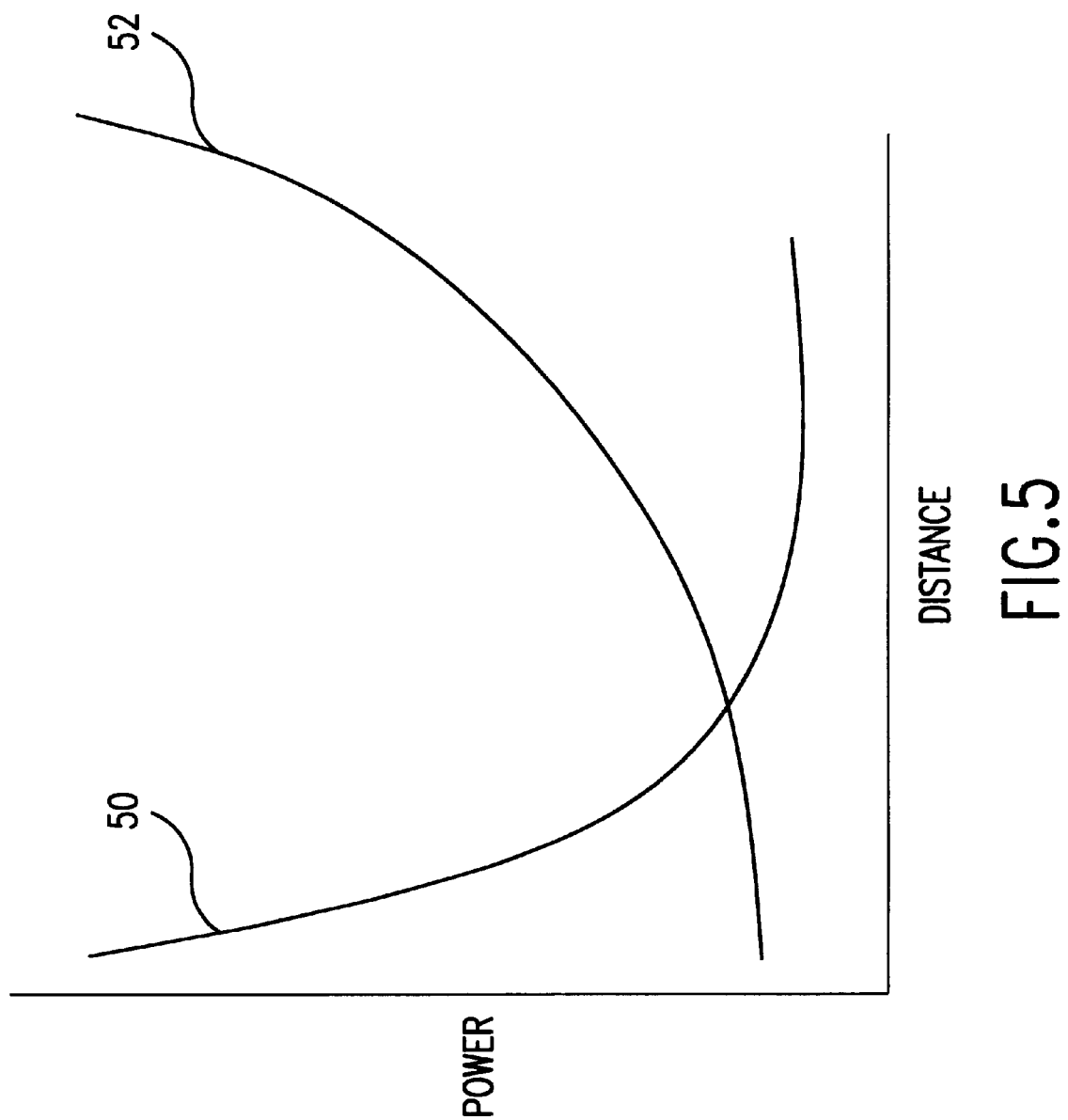
FIG. 5 shows the distribution of power along a length of fiber for a copropagating pump beam and a contrapropagating pump beam when conventional bidirectional pumping is employed.

FIG. 5 shows the distribution of pump power along a length of fiber for a copropagating pump beam 50 and a contrapropagating pump beam 52. As indicated, the power of both beams diminish exponentially from the point along the fiber where they are each introduced. As previously mentioned, bidirectional pumping, which uses both the co- and contra-propagating pump beams, is advantageous because it can supply a more constant distribution of pump power over the transmission fiber. However, a disadvantage of this approach is that the contribution from the co-propagating pump source results in an undue amount of noise coupled from the forward propagating pump to the signal.

The present invention achieves the advantage of a more uniform distribution of pump power than accrues from bidirectional pumping while avoiding coupling of pump noise. While the present invention uses both copropagating and contrapropagating pump beams, the copropagating pump beam is not used to pump the signal, as in a conventional bidirectional pumping arrangement. Rather, as discussed in more detail below, the copropagating pump beam is used to pump the contrapropagating pump beam by the production of stimulated Raman Stokes-shifted light.

In particular, in the present invention the wavelength of the copropagating beam is selected to be close to one Raman Stokes order below the wavelength of the contrapropagating pump beam. As a result, the copropagating pump beam will produce Raman Stokes-shifted light at the wavelength of the contrapropagating beam. For example, if the wavelength of the contrapropagating pump beam is required to be about 1485 nm (to pump a signal wavelength of 1550 nm), then the wavelength of the copropagating pump beam is selected to be in the 1390 nm range, which is close to one Raman Stokes order below 1485 nm.

The copropagating beam will not pump the signal because it is at too short a wavelength to do so. Since the copropagating pump beam does not pump the signal, intensity noise coupling from pump to signal does not occur. Rather, only the contrapropagating pump beam serves to pump the signal, which, as previously mentioned, does not contribute noise to the signal as a result of intensity fluctuations. Moreover, since the contrapropagating pump beam is amplified by the copropagating pump beam, the power distribution of the contrapropagating beam is modified from what would otherwise be an exponentially decreasing (or faster) power distribution along the transmission fiber.

Figure 6:
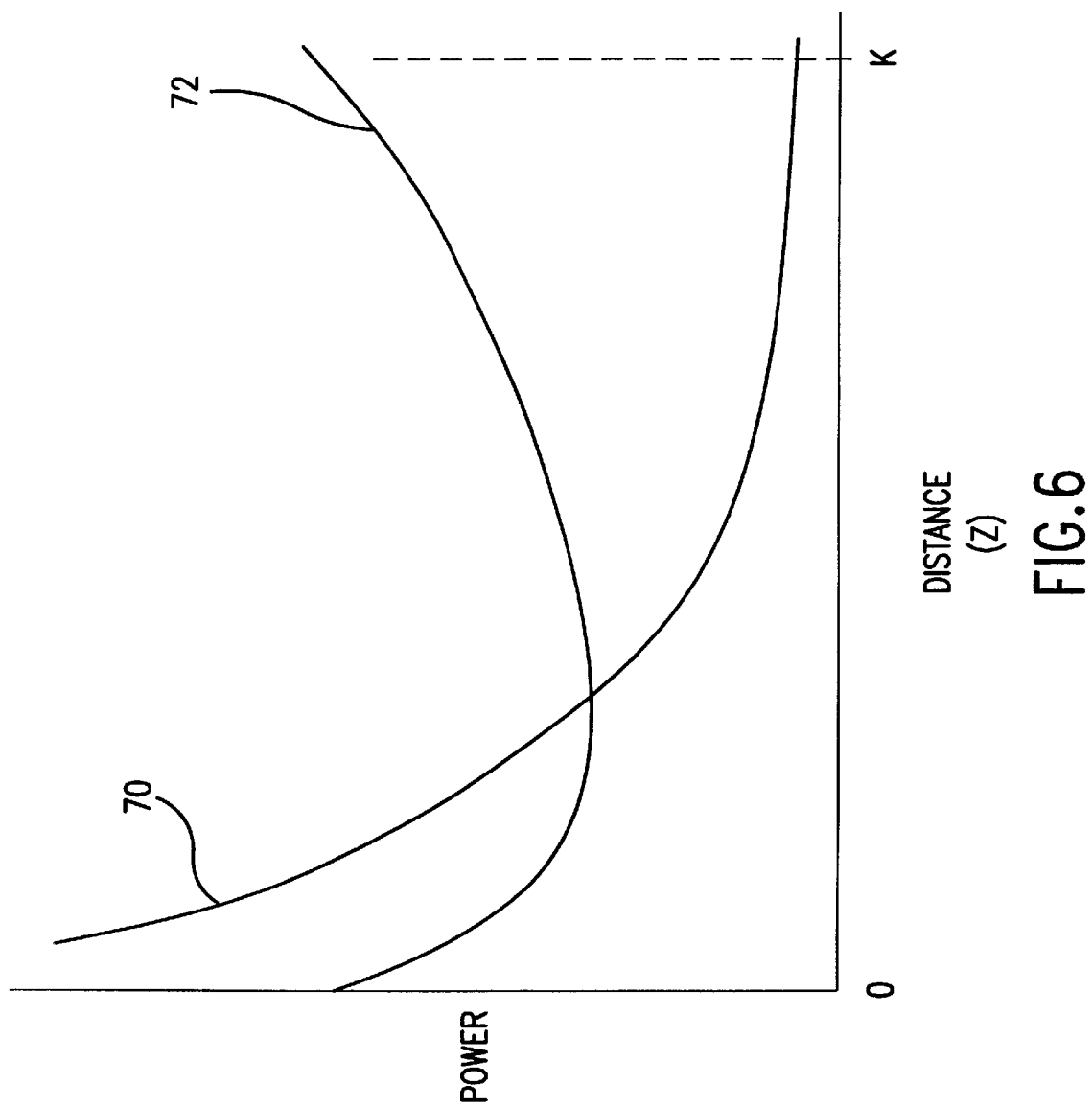
FIG. 6 shows the distribution of power along a length of fiber for a copropagating pump beam and a contrapropagating pump beam when the copropagating beam is employed to pump the contrapropagating beam in accordance with the present invention.

In one particular embodiment of the invention, the shorter wavelength, codirectional pump beam is provided at a power greater than the longer wavelength, contradirectional pump beam. As a result, the power of the contradirectional beam is more evenly distributed over the transmission path than would otherwise be the case if only the contradirectional pump by itself were employed (compare to FIG. 5). FIG. 6 shows the power of the copropagating pump beam 70, which is introduced at z=0, and the contrapropagating pump beam 72, which is introduced at z=k.

The points z=0 and z=k at which the pump beams are introduced are selected so that the contrapropagating beam 72 is introduced to the transmission path downstream from where the copropagating beam 70 is introduced. In contrast to the conventional arrangement, the results of which are shown in FIG. 5, the power of the contrapropagating pump beam 72 in the present invention does not decrease exponentially, but rather more closely resembles a uniform distribution. In particular, the contrapropagating pump beam has its greatest power levels at z=0 and z=k and can have its lowest power level in the vicinity of the point halfway between z=0 and z=k. This distribution in the contrapropagating pump beam arises because the gain imparted by copropagating beam to the contrapropagating beam is a maximum at z=0 and a minimum at z=k. One of ordinary skill in the art will recognize that by appropriately tailoring the power level of the copropagating pump beam with respect to the power level of the contrapropagating beam, the power distribution of the contrapropagating beam can be adjusted accordingly.

Figure 7:
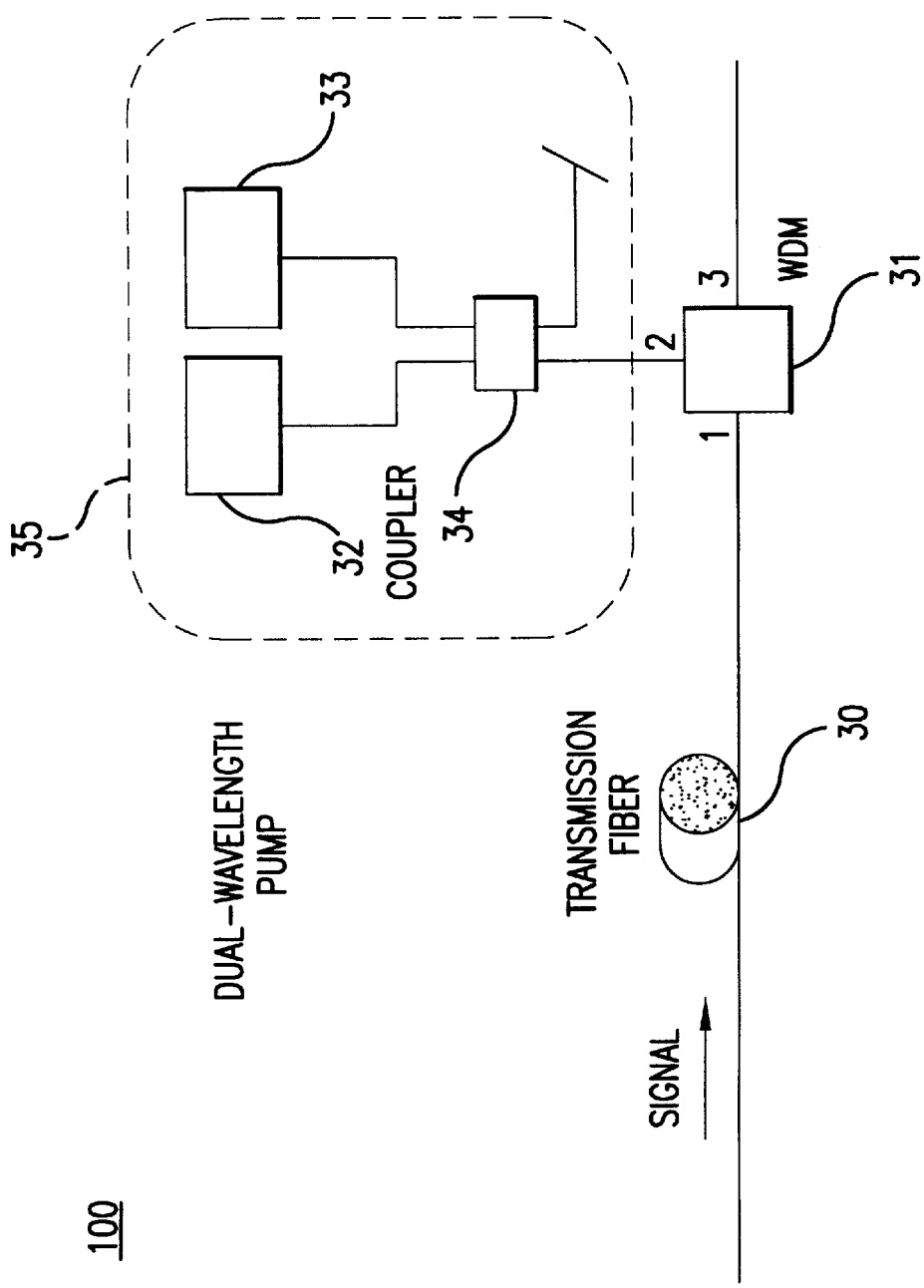
FIGS. 7 and 8 show additional examples of pump source arrangements that may be used in the present invention.
Figure 8:
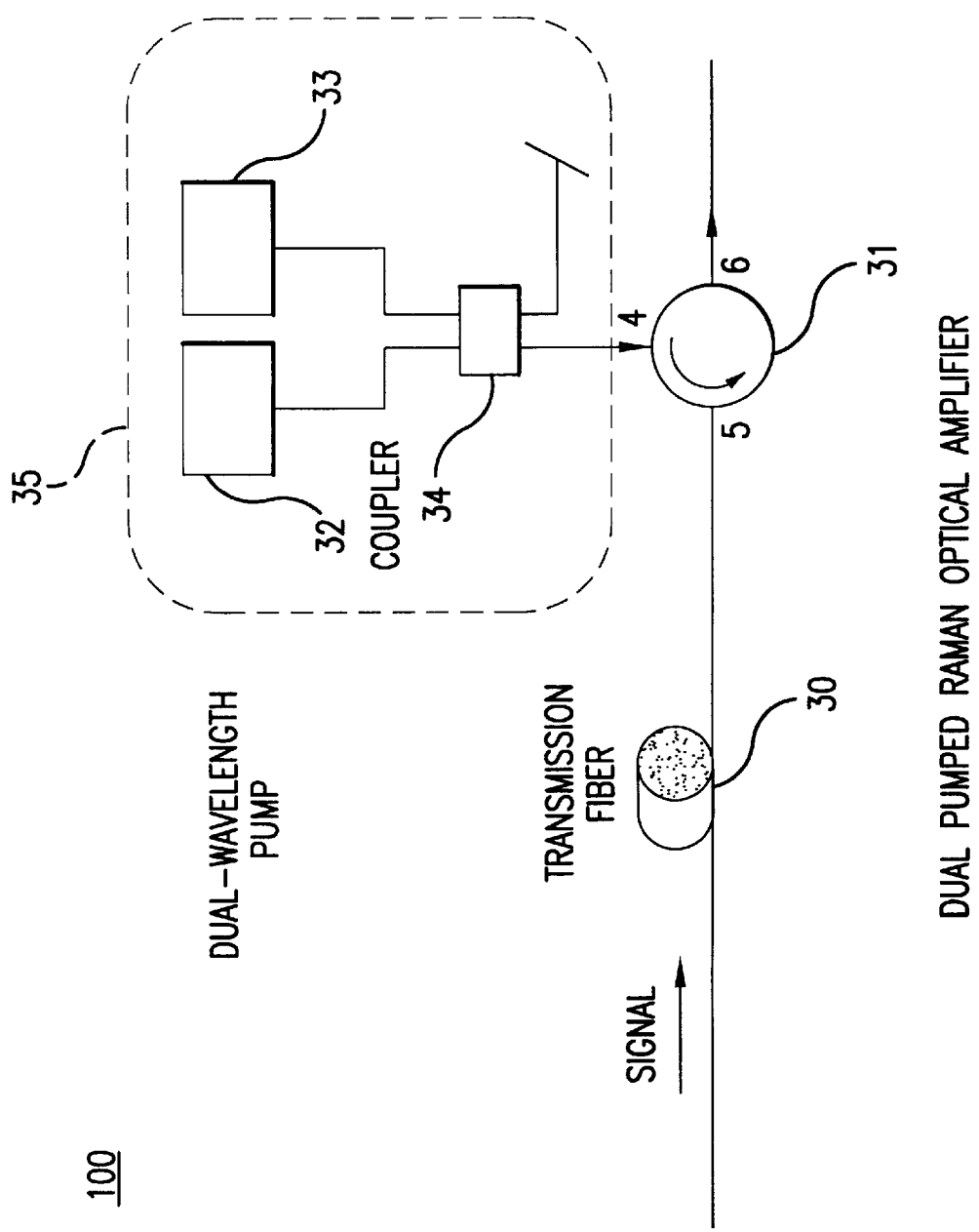

The individual pump sources 21 and 23 shown in FIGS. 3 and 4 may produce a single pump wavelength or a range of pump wavelengths. For example, as shown in FIG. 7, the pump source may be a pump unit 35 of the type disclosed in copending U.S. appl. Ser. No. [Kidorf 7 5], which is used to increase the bandwidth of the Raman amplifier. The pump unit 35 includes first and second optical pump sources 32 and 33. An optical coupler 34 combines the energy from pump sources 32 and 33 and directs the resulting beam to WDM coupler 31. As explained in more detail in [Kidorf 7 5], the pump sources 32 and 33 generate pump energy at different wavelengths selected to maximize the amplifier bandwidth. For example, pump source 32 may provide pump energy at 1455 nm and pump source 33 may provide pump energy at 1495 nm to amplify a WDM signal ranging from 1530–1610 nm. It also may be advantageous to replace the WDM coupler 31 with a circulator, as shown in FIG. 8.

What is claimed is:

1. A method of providing pump energy to an optical fiber located along an optical transmission path, said optical fiber imparting Raman amplification to an optical signal traveling therein, said method comprising:

generating a first beam of pump energy at a predetermined pump wavelength so as to impart Raman amplification at about the optical signal wavelength and generating a second beam of pump energy at a predetermined pump wavelength about one Raman Stokes order below said predetermined pump wavelength of said first beam of pump energy so as to impart Raman amplification at about said predetermined pump wavelength of said first beam of pump energy;

introducing the first beam of pump energy to the optical fiber so that it contrapropagates with respect to the optical signal; and introducing the second beam of pump energy to the optical fiber so that it contrapropagates with respect to the first beam of pump energy.

2. The method of claim 1 wherein said first beam of pump energy has a wavelength of about 1485 nm and the second beam of pump energy has a wavelength of about 1390 nm.

3. The method of claim 1 further comprising the step of selecting the power of the second beam to be higher than the power level of the first beam.

4. The method of claim 3 wherein the power selecting step is performed so that a power distribution of the first beam along the optical fiber has a prescribed degree of uniformity.

5. The method of claim 4 wherein said prescribed degree of uniformity is greater than the degree of uniformity that is achievable by the first beam by itself.

6. The method of claim 1 wherein the first beam of pump energy has a first pump bandwidth corresponding to the bandwidth of the optical signal and the second beam of pump energy has a second pump bandwidth offset from the first pump bandwidth by one Raman Stokes order.

7. An optical transmission system, comprising:

first and second terminals remotely located with respect to one another;

an optical transmission path coupling the first terminal to the second terminal for transmitting an optical signal therebetween;

a Raman amplifier providing gain to the optical signal in at least a portion of the optical transmission path, said amplifier including;

a first source of pump energy for providing a first beam of pump energy at a predetermined pump wavelength so as to impart Raman amplification at about the optical signal wavelength, said first beam of pump energy contrapropagating with respect to the optical signal; and a second source of pump energy at a pump wavelength about one Raman Stokes order below said pump wavelength of said first beam of pump energy so as to impart Raman amplification at about said predetermined pump wavelength of said first beam of pump energy, said second beam of pump energy contrapropagating with respect to the first beam of pump energy.

8. The system of claim 7 wherein said first beam of pump energy has a wavelength of about 1485 nm and the second beam of pump energy has a wavelength of about 1390 nm.

9. The system of claim 7 wherein the second beam has a power higher than the first beam.

10. The system of claim 9 wherein a power distribution of the first beam along said portion of the optical transmission path has a prescribed degree of uniformity.

11. The system of claim 10 wherein said prescribed degree of uniformity is greater than the degree of uniformity that is achievable by the first beam by itself without the second beam.

12. The system of claim 7 wherein the first beam of pump energy has a first pump bandwidth corresponding to the bandwidth of the optical signal and the second beam of pump energy has a second pump bandwidth offset from the first pump bandwidth by one Raman Stokes order.

13. A Raman amplifier, comprising:

at least a portion of optical fiber in which an optical signal travels for providing a gain medium;

a first source of pump energy for providing a first beam of pump energy at a predetermined pump wavelength so as to impart Raman amplification at about the optical signal wavelength, said first beam of pump energy contrapropagating with respect to the optical signal; and a second source of pump energy at a pump wavelength about one Raman Stokes order below said pump wavelength of said first beam of pump energy so as to impart Raman amplification at about said predetermined pump wavelength of said first beam of pump energy, said second beam of pump energy contrapropagating with respect to the first beam of pump energy.

14. The amplifier of claim 13 wherein said first beam of pump energy has a wavelength of about 1485 nm and the second beam of pump energy has a wavelength of about 1390 nm.

15. The amplifier of claim 13 wherein the second beam has a power higher than the first beam.

16. The amplifier of claim 15 wherein a power distribution of the first beam along said portion of optical fiber has a prescribed degree of uniformity.

17. The amplifier of claim 16 wherein said prescribed degree of uniformity is greater than the degree of uniformity that is achievable by the first beam by itself without the second beam.

18. The amplifier of claim 13 wherein the first beam of pump energy has a first pump bandwidth corresponding to the bandwidth of the optical signal and the second beam of pump energy has a second pump bandwidth offset from the first pump bandwidth by one Raman Stokes order.

19. A method of providing pump energy to an optical fiber located along an optical transmission path, said optical fiber imparting Raman amplification to an optical signal traveling therein, said method comprising;

coupling to the optical fiber a first beam of pump energy at a predetermined pump wavelength so as to impart Raman amplification at about the optical signal wavelength, said first beam traveling along the optical fiber so that it is contrapropagating with respect to the signal; and amplifying said first beam of pump energy with a second beam of pump energy having a pump wavelength about one Raman Stokes order below said pump wavelength of said first beam of pump energy.

20. The method of claim 19 wherein said first beam of pump energy has a wavelength of about 1485 nm and the second beam of pump energy has a wavelength of about 1390 nm.

21. The method of claim 19 further comprising the step of selecting the power of the second beam to be higher than the power level of the first beam.

22. The method of claim 21 wherein the power selecting step is performed so that a power distribution of the first beam along the optical fiber has a prescribed degree of uniformity.

23. The method of claim 22 wherein said prescribed degree of uniformity is greater than the degree of uniformity that is achievable by the first beam by itself.

24. The method of claim 19 wherein the first beam of pump energy has a first pump bandwidth corresponding to the bandwidth of the optical signal and the second beam of pump energy has a second pump bandwidth offset from the first pump bandwidth by one Raman Stokes order.

* * * * *